US011854250B2

United States Patent
Sakai et al.

(10) Patent No.: US 11,854,250 B2
(45) Date of Patent: Dec. 26, 2023

(54) PORTABLE TERMINAL AND OSHIBORI MANAGEMENT SYSTEM

(71) Applicant: FSX, INC., Tokyo (JP)

(72) Inventors: Yasuyuki Sakai, Tokyo (JP); Taku Watanabe, Tokyo (JP)

(73) Assignee: FSX, INC., Tokyo (JP)

( * ) Notice: Subject to any disclaimer, the term of this patent is extended or adjusted under 35 U.S.C. 154(b) by 120 days.

(21) Appl. No.: 17/755,088

(22) PCT Filed: Aug. 17, 2021

(86) PCT No.: PCT/JP2021/029993
§ 371 (c)(1),
(2) Date: Apr. 21, 2022

(87) PCT Pub. No.: WO2022/059404
PCT Pub. Date: Mar. 24, 2022

(65) Prior Publication Data
US 2022/0375212 A1 Nov. 24, 2022

(30) Foreign Application Priority Data
Sep. 16, 2020 (JP) ................................ 2020-155461

(51) Int. Cl.
*G06V 10/82* (2022.01)
*G06T 7/13* (2017.01)
(Continued)

(52) U.S. Cl.
CPC ......... *G06V 10/82* (2022.01); *G06Q 10/0875* (2013.01); *G06T 7/13* (2017.01);
(Continued)

(58) Field of Classification Search
None
See application file for complete search history.

(56) References Cited

U.S. PATENT DOCUMENTS

2017/0245667 A1* 8/2017 Gaines ..................... A47K 7/03
2021/0065351 A1* 3/2021 Yamaji .................... G06F 17/18
(Continued)

FOREIGN PATENT DOCUMENTS

CN 202013324 U 10/2011
JP 2001-321736 A 11/2001
(Continued)

OTHER PUBLICATIONS

International Search Report and Written Opinion dated Sep. 28, 2021, in connection with International Patent Application No. PCT/JP2021/029993, filed Aug. 17, 2021, 8 pgs. (including translation).

(Continued)

*Primary Examiner* — Eileen M Adams
(74) *Attorney, Agent, or Firm* — CHIESA, SHAHINIAN & GIANTOMASI PC

(57) ABSTRACT

A portable terminal configured to estimate the number of used wet towels, or oshiboris, stored in a collection box, including: an information receiving unit for receives pre-collection store information; a photographing unit for capturing an image of used oshiboris stored in a collection box from above; a learning model storing unit for storing a learning model trained by a neural network; an image acquiring unit for acquiring an image for estimation photographed by the photographing unit. The estimating unit estimates a number of used oshiboris from the image for estimation acquired by the image acquiring unit, with the learning model stored in the learning model storing unit, by the neural network. The display unit displays an estimation result estimated by the estimating unit. The information transmitting unit transmits post-collection store information added the estimation result to the pre-collection store infor- (Continued)

mation received by the information receiving unit to the core system.

14 Claims, 12 Drawing Sheets

(51) Int. Cl.
| | | |
|---|---|---|
| *G06T 7/70* | (2017.01) | |
| *G06V 10/72* | (2022.01) | |
| *G06V 10/764* | (2022.01) | |
| *G06V 10/44* | (2022.01) | |
| *G06Q 10/0875* | (2023.01) | |
| *G06V 10/24* | (2022.01) | |
| *H04N 23/63* | (2023.01) | |
| *H04N 23/60* | (2023.01) | |

(52) U.S. Cl.
CPC ............... *G06T 7/70* (2017.01); *G06V 10/24* (2022.01); *G06V 10/44* (2022.01); *G06V 10/72* (2022.01); *G06V 10/764* (2022.01); *H04N 23/63* (2023.01); *H04N 23/64* (2023.01); *G06T 2207/10024* (2013.01); *G06T 2207/20081* (2013.01); *G06T 2207/20084* (2013.01); *G06T 2207/30242* (2013.01)

(56) References Cited

U.S. PATENT DOCUMENTS

2021/0113093 A1* 4/2021 Nozawa ............... A61B 5/7239
2021/0309248 A1* 10/2021 Choe ..................... B60W 50/06

FOREIGN PATENT DOCUMENTS

| JP | 2002-32844 A | 8/2003 |
|---|---|---|
| JP | 2019-153077 A | 9/2019 |
| WO | 2019/045091 A1 | 3/2019 |

OTHER PUBLICATIONS

Second Office Action dated Jan. 18, 2023 in connection with Chinese Patent Application No. 202180006691.4, 18 pgs. (including translation).

International Preliminary Report on Patentability (IPRP) dated Mar. 21, 2023 in connection with International Patent Application No. PCT/JP2021/029993, filed Aug. 17, 2021, 8 pgs. (including translation).

First Office Action dated Oct. 20, 2022 in connection with Chinese Patent Application No. 202180006691.4, 17 pgs. (including translation).

* cited by examiner

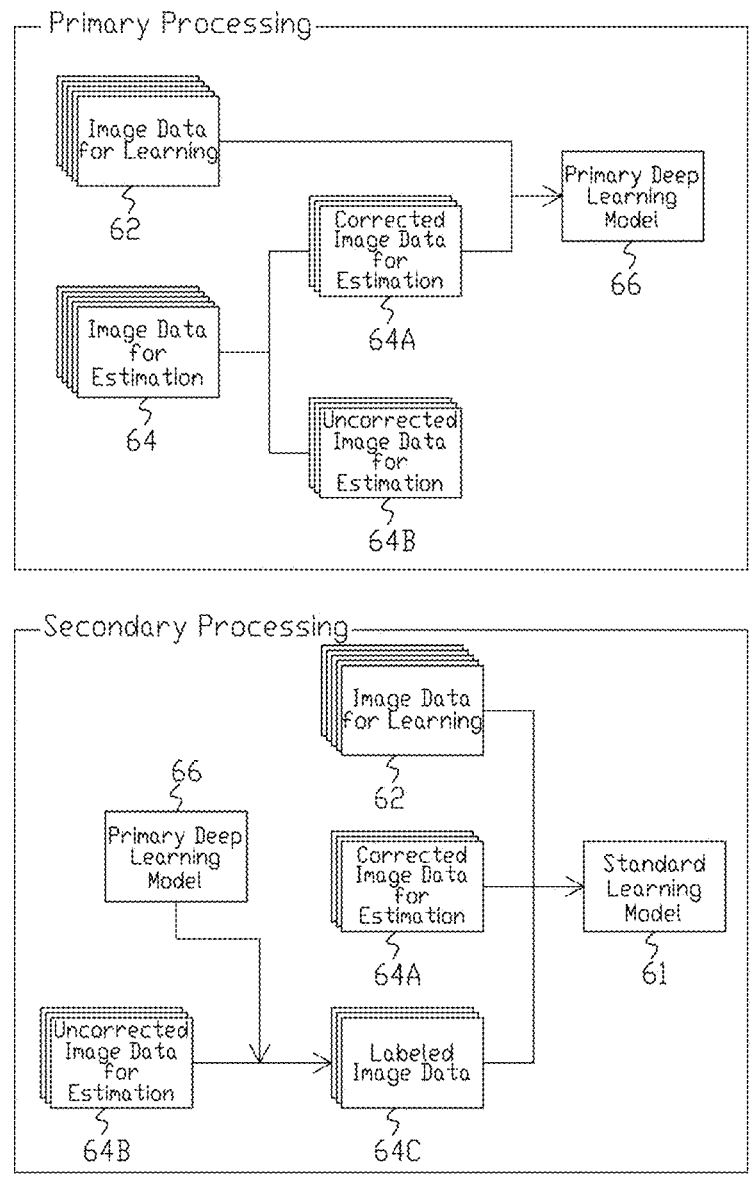

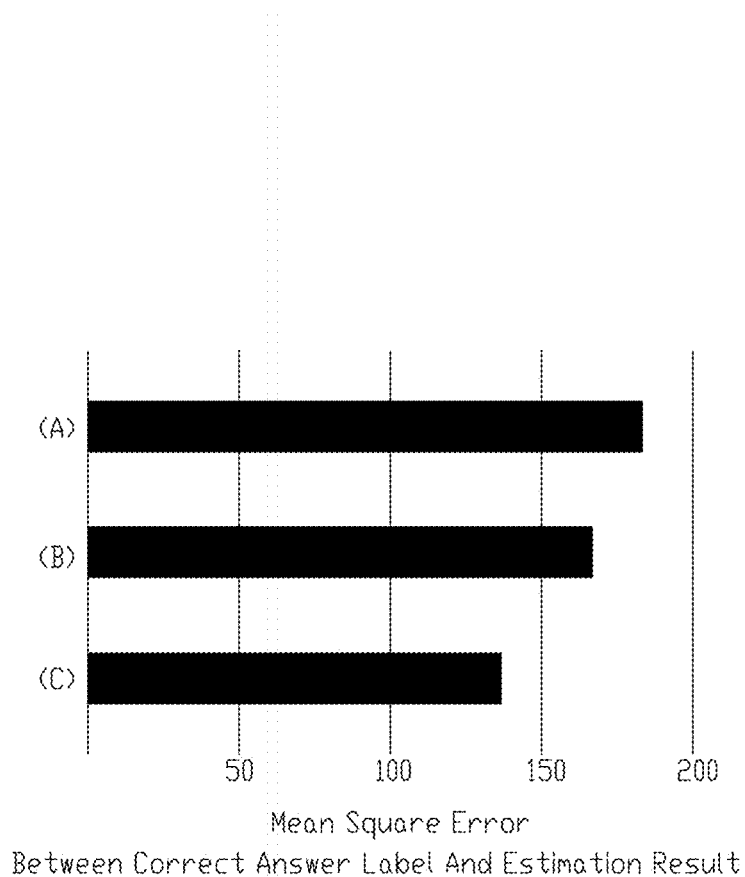

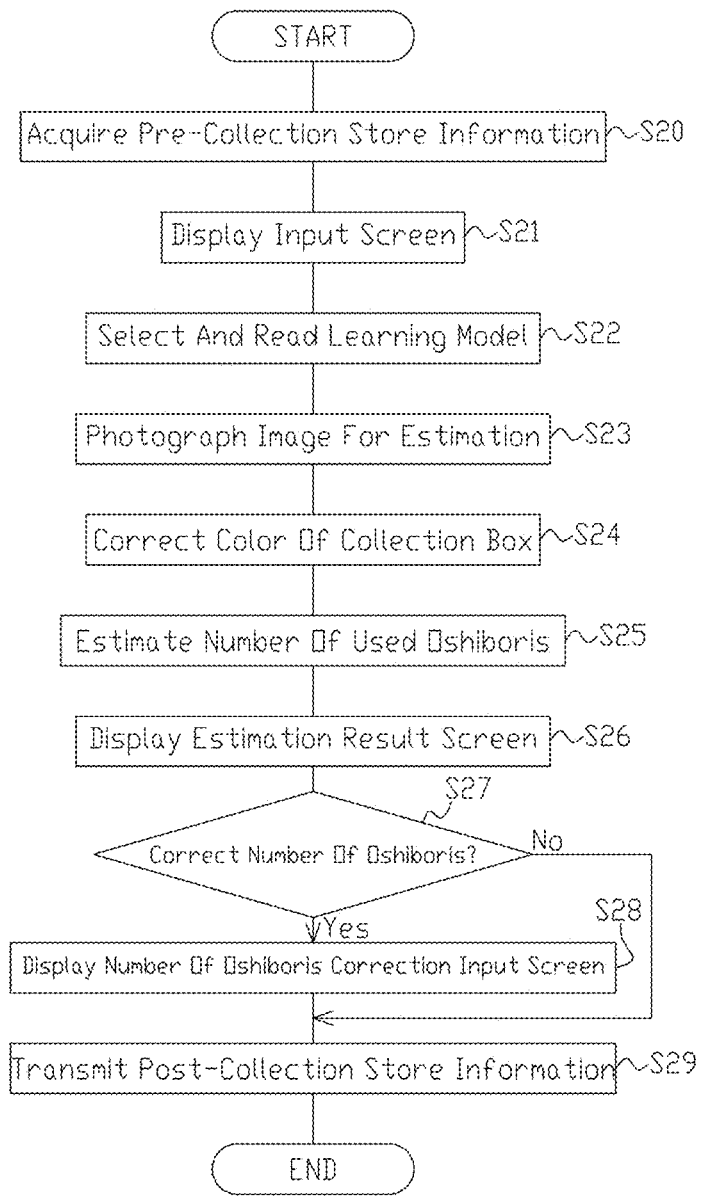

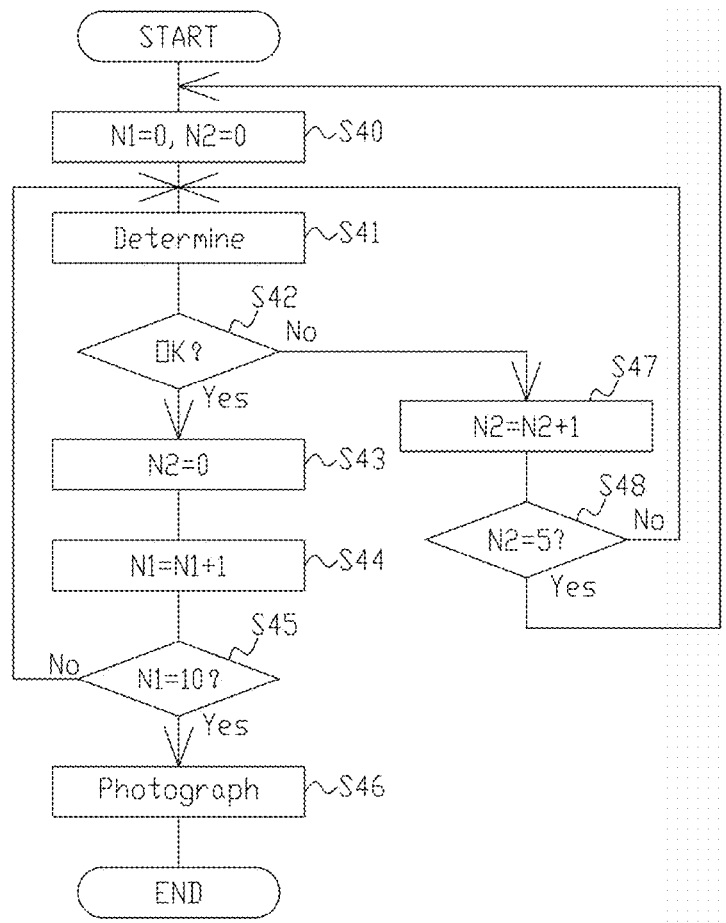

PORTABLE TERMINAL AND OSHIBORI MANAGEMENT SYSTEM

CROSS-REFERENCE TO RELATED APPLICATIONS

This application is a national stage of International Patent Application Serial No. PCT/JP2021/029993, filed Aug. 17, 2021, which claims priority to Japanese Patent Application No. 2020-155461, filed Sep. 16, 2020, the disclosures of all are incorporated herein by reference in their entirety.

TECHNICAL FIELD

The present invention relates to a portable terminal and an oshibori (wet hand towel) management system for estimating the number of used oshiboris (wet hand towels) in a collection box.

BACKGROUND ART

Oshiboris lent out to a restaurant or the like are used in the restaurant and then collected in a state of being casually put in a collection box. A deliverer who delivers and collects the oshiboris needs to check the number of used oshiboris in the collection box in order to grasp the number of oshiboris to be delivered next time and the number of lost oshiboris. However, the operation of counting the oshiboris one by one is inefficient, and there is no time to count the oshiboris. Therefore, the deliverer visually recognizes the amount of the oshiboris in the collection box and estimates the number of oshiboris from an empirical rule.

However, it is difficult for the deliverer inexperienced in collecting oshiboris to estimate the number of the oshiboris. In addition, since various deliverers estimate the number of oshiboris, unevenness occurs in the estimated numbers. Therefore, it is desired to construct a system for counting oshiboris. For example, an individual counting system described in Patent Literature 1 is known as a system for counting individuals.

CITATION LIST

Patent Literature

Patent Literature 1: JP 2019-153077 A

SUMMARY OF INVENTION

Technical Problem

The individual counting system described in Patent Literature 1 counts moving individuals such as fish and is not a system that counts objects that do not move like oshiboris. The size of oshiboris is determined and the oshiboris do not move. However, since the oshiboris are unevenly stored in the collection box, the density is not constant and the number of oshiboris in the collection box cannot be calculated based on the volume of the collection box. In addition, since the amounts of moisture stored in the used oshiboris is different from one another, the weights of the used oshiboris are also different from one another. Even if the same oshiboris are used, the weights of the oshiboris before use and the used oshiboris are different from each other. Therefore, the number of oshiboris in the collection box cannot be calculated based on the weight of the collection box storing the oshiboris.

An object of the present invention is to provide a portable terminal and an oshibori management system capable of quickly estimating the number of used oshiboris stored in a collection box.

Solution to Problem

A portable terminal according to one aspect includes an information receiving unit, a photographing unit, a learning model storing unit, an image acquiring unit, an estimating unit, a display unit, and an information transmitting unit. The information receiving unit receives pre-collection store information from a core system, the pre-collection store information including a store to which oshiboris are delivered, a type of the oshiboris used by the store, a number of the oshiboris delivered to the store, a number of the oshiboris collected from the store, and a number of the oshiboris in stock at the store. The photographing unit photographs used oshiboris stored in a collection box from above. The learning model storing unit stores a learning model learned by a neural network with an image for learning as an input value and a number of the used oshiboris as an output value and the image for learning is photographed the used oshiboris stored in the collection box from above. The image acquiring unit acquires an image for estimation photographed by the photographing unit. The estimating unit estimates a number of used oshiboris from the image for estimation acquired by the image acquiring unit, with the learning model stored in the learning model storing unit, by the neural network. The display unit displays an estimation result estimated by the estimating unit. The information transmitting unit transmits post-collection store information added the estimation result to the pre-collection store information received by the information receiving unit to the core system.

The portable terminal according to the aspect further includes a corrected number acquiring unit that acquires a corrected number correcting the number of used oshiboris in the estimation result. The information transmitting unit transmits the post-collection store information added with the corrected number to the core system. The learning model is a secondary deep learning model being deep-learned by the neural network with the image for learning, a corrected image for estimation and an uncorrected image for estimation being estimated with a primary deep learning model as the input value. The corrected image for estimation is the image for estimation photographed in the past and with corrected the estimation result. The uncorrected image for estimation is the image for estimation photographed in the past and without corrected the estimation result. The primary deep learning model is deep-learned by the neural network with the image for learning and the corrected image for estimation as the input value. The number of the used oshiboris in the uncorrected image for estimation is estimated from the uncorrected image for estimation with the primary deep learning model.

Further, the learning model storing unit of the portable terminal according to the aspect stores the learning model incorporating a parameter for estimating the number of used oshiboris from an extracted contour of an outer edge of a used oshibori group with respect to an extracted outer frame of the collection box. The extracted outer frame of the collection box and the extracted contour of the outer edge of the used oshibori group stored in the collection box is extracted from the image for learning.

The portable terminal according to the aspect further includes a display control unit and a photographing control unit. The display control unit causes the display unit to display a live view image and causes the display unit to display a guide frame for guiding a position of the outer frame of the collection box with respect to a photographing range to be a predetermined position when the photographing unit photographs the image for estimation. The photographing control unit causes the photographing unit to photograph the image for estimation when the position of the outer frame of the collection box becomes the predetermined position.

The portable terminal according to the aspect further includes a determining unit, a counting unit, and a photographing control unit. The determining unit causes the display unit to display a live view image and determines at each predetermined interval whether the position of the outer frame of the collection box with respect to the photographing range is in a predetermined position when the photographing unit photographs the image for estimation. The counting unit counts a number of times the determining unit determines that the position of the outer frame of the collection box is in the predetermined position. The photographing control unit causes the photographing unit to photograph the image for estimation when the number of times counted by the counting unit reaches a predetermined number. Further, the photographing control unit resets the count by the counting unit when the determining unit determines, consecutively a preset number of times, that the position of the outer frame of the collection box is not in the predetermined position.

In addition, the learning model storing unit of the portable terminal according to the aspect stores the learning model learned with the image for learning with image data of further on the outer side than the outer frame of the collection box deleted, and the estimating unit estimates the number of used oshiboris with the image for estimation with image data of further on the outer side than the outer frame of the collection box deleted.

The portable terminal according the aspect further includes a density detecting unit that detects density of the used oshiboris in the collection box based on the image for estimation, and the estimating unit estimates the number of used oshiboris using the density detected by the density detecting unit.

The portable terminal according to the aspect further includes a density input unit that inputs whether the density of the used oshiboris in the collection box is higher than predetermined density, and the estimating unit estimates the number of used oshiboris using an input result input by the density input unit.

The portable terminal according to the aspect further includes an arithmetic operation unit that performs an arithmetic operation concerning the number of used oshiboris. The photographing unit photographs a plurality of the images for estimation. The estimating unit respectively estimates numbers of used oshiboris in the plurality of images for estimation. The arithmetic operation unit calculates an average of a plurality of estimation results estimated by the estimating unit. The display unit displays the average calculated by the arithmetic operation unit as the estimation result.

The portable terminal according to the aspect further includes an abnormal value detecting unit that detects an abnormal value of the plurality of estimation results, and the arithmetic operation unit calculates the average of the plurality of estimation results excluding the abnormal value detected by the abnormal value detecting unit.

The portable terminal according to the aspect further includes a type acquiring unit that acquires a type of the oshiboris and a correction coefficient storing unit that stores a correction coefficient based on weight of the oshiboris set for each type of the oshiboris. The estimating unit acquires the correction coefficient of the type of the oshiboris acquired by the type acquiring unit from the correction coefficient storing unit and corrects the number of used oshiboris using the acquired correction coefficient.

The portable terminal according to the aspect includes a color correcting unit that corrects a color of the collection box appearing in the image for estimation to a color of the collection box appearing in the image for learning or an approximate color of the color.

A portable terminal according to the aspect includes an information receiving unit, a photographing unit, a learning model storing unit, an image acquiring unit, an estimating unit, a display unit, and an information transmitting unit. The information receiving unit receives pre-collection store information from a core system, the pre-collection store information including a store to which oshiboris are delivered, a type of the oshiboris used by the store, a number of the oshiboris delivered to the store, a number of the oshiboris collected from the store, and a number of the oshiboris in stock at the store. The photographing unit photographs first used oshiboris stored in a collection box from above. The learning model storing unit stores a learning model learned by a neural network with an image for learning as an input value and a number of the first used oshiboris as an output value. The image for learning is photographed second used oshiboris stored in the collection box from above. The second used oshiboris is different from the first used oshiboris. The image acquiring unit acquires an image for estimation photographed by the photographing unit. The estimating unit estimates a number of first used oshiboris from the image for estimation acquired by the image acquiring unit, with the learning model stored in the learning model storing unit, by the neural network. The display unit displays an estimation result estimated by the estimating unit. The information transmitting unit transmits post-collection store information added the estimation result to the pre-collection store information received by the information receiving unit to the core system.

In addition, an oshibori management system according one aspect includes a portable terminal and a core system according to the aspect. The core system includes an information storing unit that stores pre-collection store information, a transmitting unit that transmits the pre-collection store information stored in the information storing unit to the portable terminal, a receiving unit that receives post-collection store information transmitted from the portable terminal, and an update unit that updates the pre-collection store information by causing the information storing unit to store the post-collection store information received from the receiving unit.

Advantageous Effects of Invention

According to the present invention, it is possible to provide a portable terminal and an oshibori management system that can quickly estimate the number of used oshiboris stored in a collection box.

BRIEF DESCRIPTION OF DRAWINGS

FIG. 9 is a diagram explaining a standard learning model according to the second embodiment.

FIG. 10 is a graph illustrating a mean square error between a correct answer label and an estimation result of a first-type learning model according to the second embodiment.

FIG. 11 is a flowchart explaining processing executed by the oshibori management system according to the second embodiment in order to estimate the number of used oshiboris stored in a collection box.

FIG. 12 is a flowchart explaining processing executed by a photographing control unit according to the second embodiment in order to photograph an image for estimation.

DESCRIPTION OF EMBODIMENT

Figure 1:
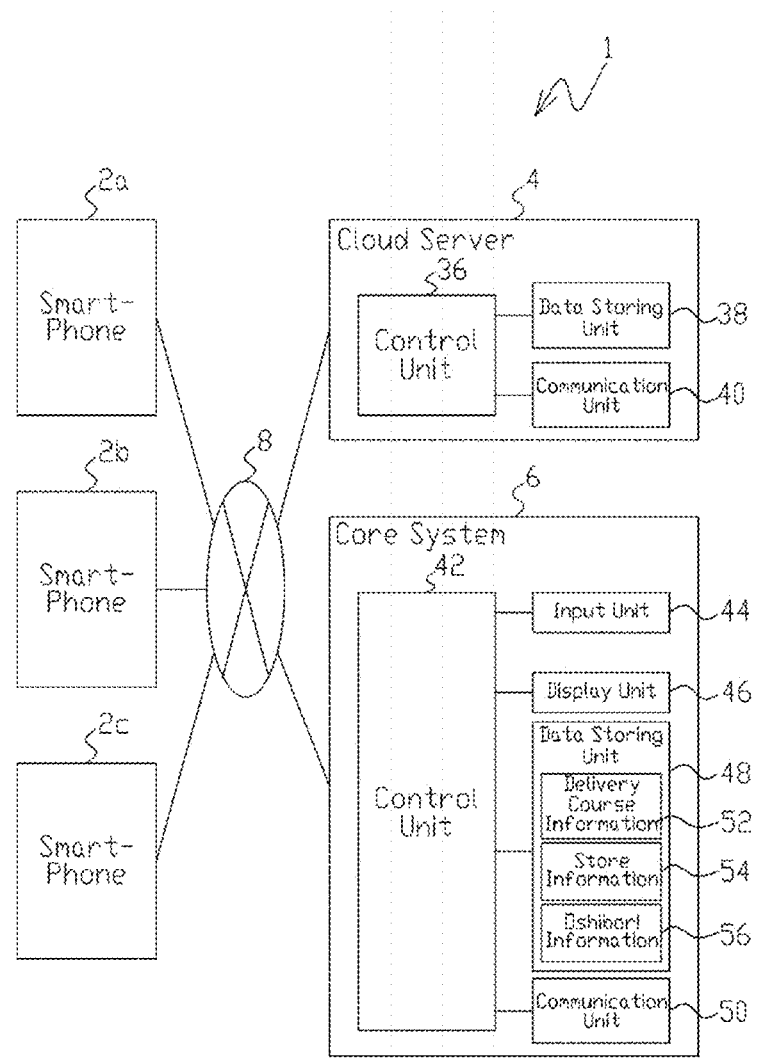
FIG. 1 is a block diagram of an oshibori management system according to a first embodiment.

An oshibori management system according to a first embodiment of the present invention is explained below with reference to the drawings. FIG. 1 is a block diagram for explaining the oshibori management system according to the first embodiment. An oshibori management system 1 according to the first embodiment is a system for managing the number of oshiboris to be lent out to a store such as a restaurant and includes a plurality of smartphones 2a, 2b, and 2c, a Cloud server 4, and a core system 6 as illustrated in FIG. 1.

The smartphones 2a to 2c are portable terminals (portable information terminals) carried by a deliverer who delivers oshiboris to stores and collects used oshiboris from the stores and may be tablets or the like. The Cloud server 4 is a server that collects and stores data uploaded from the smartphones 2a to 2c and may be another server such as a physical server. The core system 6 is a personal computer or the like disposed in an office building. The smartphones 2a to 2c, the Cloud server 4, and the core system 6 are connected to one another by a network 8. Although FIG. 1 illustrates a case where three smartphones 2a to 2c are connected to the network 8. Actually, a large number of smartphones like the smartphones 2a to 2c are connected to the network 8. In the present embodiment, the case where the Cloud server 4 and the core system 6 are connected by the network 8 is taken as an example. However, a system in which a server and a core system are integrally formed, that is, a core system having a server function may be used.

Figure 2:
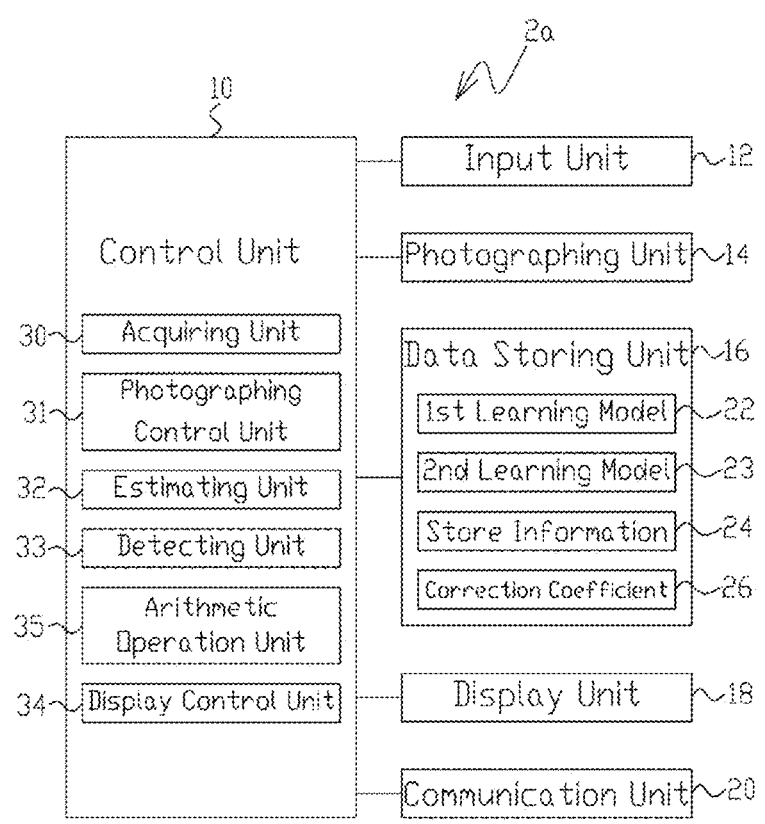
FIG. 2 is a block diagram of a smartphone system according to the first embodiment.

FIG. 2 is a block diagram illustrating a system configuration of the smartphone 2a. The smartphone 2a includes a system for estimating, when a deliverer collects used oshiboris, using artificial intelligence (AI), the number of used oshiboris stored in a collection box and includes a control unit (a controller) 10 that comprehensively controls each unit of the smartphone 2a as illustrated in FIG. 2. An input unit 12, a photographing unit 14, a data storing unit 16, a display unit 18, and a communication unit 20 are connected to the control unit 10.

Figure 3:
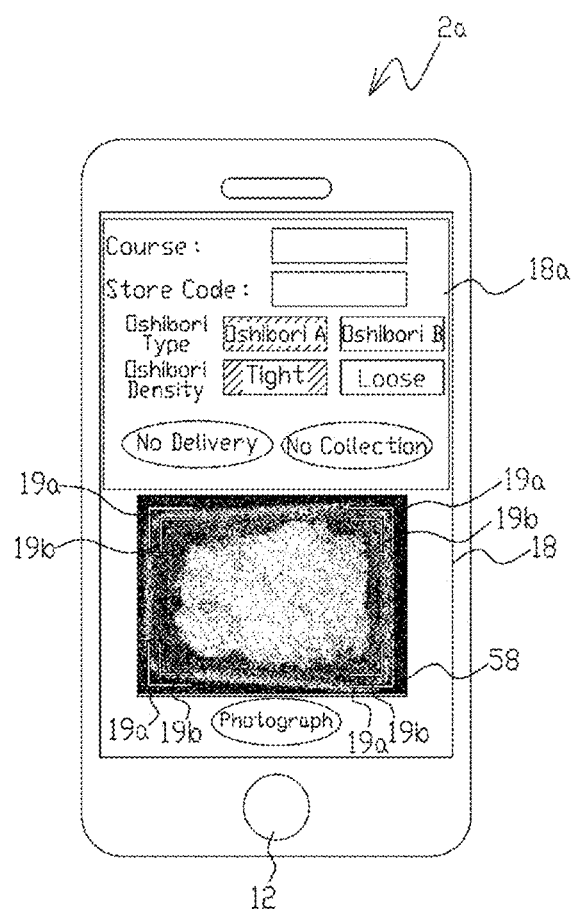
FIG. 3 is a diagram illustrating a display example on a display unit of the smartphone according to the first embodiment.

The input unit 12 is a touch panel, a button, or the like, and inputs information concerning a store (store code) where used oshiboris are used, a type of oshiboris (oshiboris A or oshiboris B), and the like when the used oshiboris are collected (see FIG. 3). In addition, the input unit 12 inputs whether or not the density of used oshiboris in the collection box is higher than predetermined density ("tight" or "loose") (see FIG. 3). The photographing unit 14 is a camera or the like and photographs, according to an instruction of the control unit 10 (a photographing control unit 31 explained below), the used oshiboris stored in the collection box from above when the used oshiboris are collected. In the present embodiment, the photographing unit 14 photographs three images for estimation (images obtained by photographing the used oshiboris stored in the collection box from above).

The data storing unit 16 temporarily stores information necessary for arithmetic processing by the control unit 10 such as an image photographed by the photographing unit 14. In addition, the data storing unit 16 stores a first learning model 22 and a second learning model 23 used for estimation by the estimating unit 32 explained below, store information 24 concerning a store where a deliverer collects used oshiboris, a correction coefficient 26 set for each type of oshiboris, and the like.

The first learning model 22 and the second learning model 23 are models learned in advance in order to estimate the number of used oshiboris stored in the collection box using AI and are incorporated in advance in the number of oshiboris estimation system. The first learning model 22 and the second learning model 23 are models learned by a neural network having, as an input value, an image for learning obtained by photographing used oshiboris stored in the collection box from above and the number of used oshiboris as an output value. The first learning model 22 and the second learning model 23 also incorporate parameters for extracting, from the image for learning, an outer frame of the collection box and a contour of the outer edge of the used oshibori group stored in the collection box (all the used oshiboris stored in the collection box) and for estimating the number of used oshiboris from the extracted contour of the outer edge of the used oshibori group with respect to the extracted outer frame of the collection box.

The neural network is divided into an input layer, an intermediate layer, and an output layer. In the input layer, data obtained by dividing the image for learning into pixels is input, and a contour of the image is extracted from the input data. Next, in the intermediate layer, the contour of the image extracted in the input layer is subjected to an image analysis. In the output layer, an estimated number of used oshiboris result is output based on a result of the image analysis in the intermediate layer. The neural network mathematically calculates a number of oshiboris value (for example, 5 to 320) from the illuminance value of 0 to 1× the number of pixels for each pixel of the image. As the intermediate layer, a convolution layer, a pooling layer, a dropout layer, a fully connected layer, and a flattening layer are used in combination. Hundreds to tens of millions of parameters are stored in each layer. By performing tuning using a large number of images for learning, weighting of the parameters of the layers is changed such that an accurate result (accurate number of oshiboris) can be derived as much as possible from the input layer to the output layer via the intermediate layer.

The first learning model 22 is a learning model in the case where the density of used oshiboris stored in the collection box is higher than predetermined density (case of "tight"). The second learning model 23 is a learning model in the case where the density of used oshiboris stored in the collection box is equal to or lower than the predetermined density (case of "loose"). That is, in the case of "tight" and the case of "loose", the number of oshiboris is naturally different even if the oshiboris are the same and the volume of oshiboris in the collection box is the same. However, in the present embodiment, the accuracy of estimating the number of oshiboris is improved by dividing the learning model into the first learning model 22 and the second learning model 23 according to the density.

In the oshibori management system according to the present embodiment, it is assumed that the oshiboris A and the oshiboris B having the same size and different thicknesses, that is, the oshiboris A and the oshiboris B having different weights and volumes depending on differences in thickness are managed. The first learning model 22 and the second learning model 23 are models learned about the oshiboris A.

The store information 24 includes store information before collection such as a delivery course (delivery area) code, a store code, a type of oshiboris (oshiboris A or B), an actual average number of oshiboris collected the most recent any number of times, the number of oshiboris delivered last time, the number of oshiboris collected last time, and the number of oshiboris in stock in the store. The correction coefficient 26 is a coefficient determined for each type of oshiboris (In the present embodiment, oshiboris A and B). Since the first learning model 22 and the second learning model 23 are models learned about the oshiboris A, an indication that a correction coefficient of the oshiboris A (reference oshiboris) is 1 or the oshiboris A are the reference oshiboris is stored in the data storing unit 16. A correction coefficient of the oshiboris B is set from the weight and the number of the oshiboris B with respect to the standard oshiboris and is stored in the data storing unit 16 (the correction coefficient 26).

Figure 4:
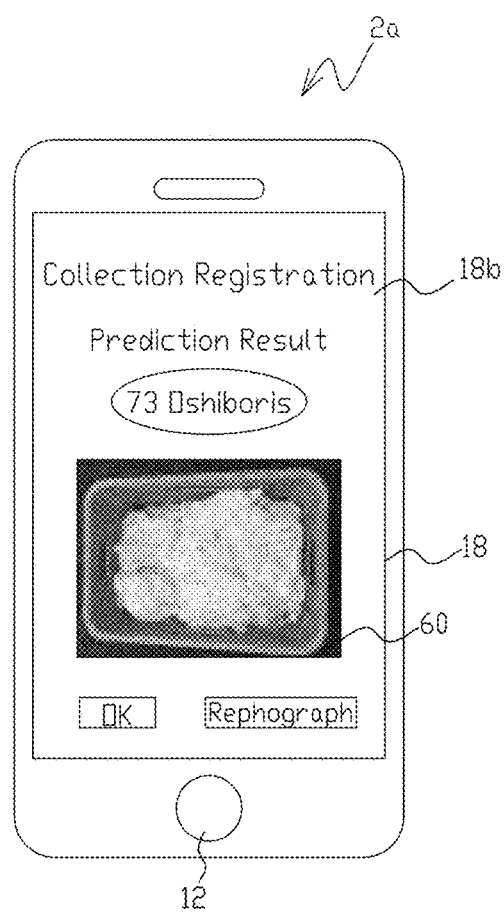
FIG. 4 is a diagram illustrating a display example on the display unit of the smartphone according to the first embodiment.
Figure 5:
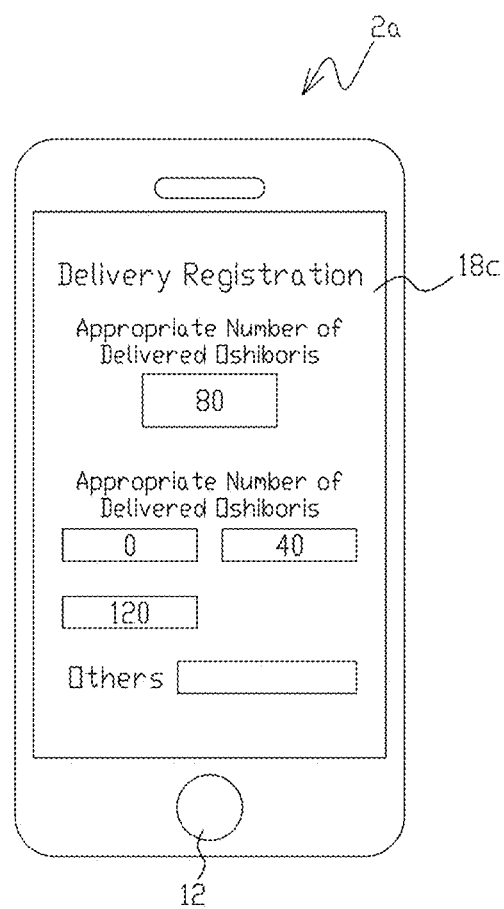
FIG. 5 is a diagram illustrating a display example on the display unit of the smartphone according to the first embodiment.

The display unit 18 is a liquid crystal display panel or the like. The display unit 18 displays a screen for inputting a store and oshibori information according to an instruction from the control unit 10 (a display control unit 34 explained below). The display unit 18 displays a screen for displaying an estimation result by the estimating unit 32 (explained below), and the like. FIGS. 3 to 5 are diagrams illustrating display examples on the display unit 18 of the smartphone 2a according to the present embodiment. FIGS. 3 to 5 will be explained below.

The communication unit 20 communicates with the Cloud server 4 and the core system 6 via the network 8. According to an instruction of the control unit 10, the communication unit 20 receives, from the core system 6 via the network 8, store information included in the delivery course input via the input unit 12, that is, store information before collection such as a store that delivers oshiboris, a type of oshiboris used by the store, the latest any number of times of oshibori collection actual average number, the number of oshiboris delivered last time, the number of oshiboris collected last time, the number of oshiboris in stock in the store, and an oshibori delivery stop flag to the store. In addition, the communication unit 20 transmits, according to an instruction from the control unit 10, to the Cloud server 4 via the network 8, post-collection store information obtained by adding a collection date, an estimated number of used oshiboris, photographing position information, and the like to the pre-collection store information received from the core system 6.

Furthermore, the control unit 10 includes an acquiring unit 30, a photographing control unit (a photographing controller) 31, an estimating unit 32, a detecting unit 33, an arithmetic operation unit 35, and a display control unit (a display controller) 34. The acquiring unit 30 acquires various kinds of information such as a store code input via the input unit 12 and an image photographed by the photographing unit 14. In addition, the acquiring unit 30 acquires information necessary for arithmetic processing by the control unit 10 from the data storing unit 16. When the outer frame of the collection box fits between a guide frame 19a on the outer side and a guide frame 19b on the inner side (see FIG. 3) displayed on the display unit 18, the photographing control unit 31 causes the photographing unit 14 to photograph an image for estimation.

The estimating unit 32 estimates, using the first learning model 22 or the second learning model 23 stored in the data storing unit 16, the number of used oshiboris from an image for estimation obtained by photographing the used oshiboris stored in the collection box from above with the photographing unit 14. At this time, the estimating unit 32 estimates the number of used oshiboris using the first learning model 22 when the density of used oshiboris input by the input unit 12 is higher than the predetermined density (when "tight" is selected) and using the second learning model 23 when the density of used oshiboris input by the input unit 12 is equal to or lower than the predetermined density (when "loose" is selected). That is, pixel data of an image for estimation is input to the input layer of the neural network, a contour of an image is extracted from the pixel data, an image analysis is performed in the intermediate layer about the contour of the image extracted in the input layer, and an estimated number of used oshiboris result of used oshiboris estimated from a result of the image analysis in the intermediate layer is output in the output layer. At this time, contours of the outer frame of the collection box and a contour of the outer edge of a used oshibori group stored in the collection box are also extracted from the image for estimation. An estimated number of used oshiboris result is output using a parameter for estimating the number of used oshiboris from the extracted contour of the outer edge of the used oshibori group with respect to the outer frame of the collection box.

The estimated number of used oshiboris result estimated using the first learning model 22 or the second learning model 23 is an estimated number of oshiboris A result. Therefore, in the case of the oshiboris B, the estimating unit 32 acquires the correction coefficient of the oshiboris B from the correction coefficient 26 of the data storing unit 16 via the acquiring unit 30 and corrects the estimated number of used oshiboris using the correction coefficient of the oshiboris B such that the estimated number of oshiboris result of the oshiboris B is obtained from the estimated number of oshiboris A.

The detecting unit 33 detects abnormal values of a plurality of (three) estimation results obtained by the estimating unit 32. In the case where a difference between the first estimation result and another estimation result exceeds a threshold, the detecting unit 33 discriminates the first estimation result as an abnormal value and performs similar discrimination about second and third estimation results. The arithmetic operation unit 35 performs an arithmetic operation concerning the number of used oshiboris. The arithmetic operation unit 35 calculates an average of a plurality of (three) estimation results estimated by the estimating unit 32. When an abnormal value is detected by the detecting unit 33, the arithmetic operation unit 35 calculates an average of a plurality of (two) estimation results excluding the abnormal value detected by the detecting unit 33.

The display control unit 34 causes the display unit 18 to display a screen 18a for inputting a store and oshibori information illustrated in FIG. 3, a collection registration screen 18b indicating an estimation result by the estimating unit 32 illustrated in FIG. 4, a delivery registration screen 18c indicating a proper number of oshiboris to be delivered illustrated in FIG. 5, and the like. Furthermore, when the photographing unit 14 photographs an image for estimation, the display control unit 34 causes the display unit 18 to display a live view image and causes the display unit 18 to display guide frames 19a and 19b for guiding the position of the outer frame of the collection box with respect to a photographing range (see FIG. 3). Note that, since the configuration of the smartphones 2b and 2c is the same as the configuration of the smartphone 2a, explanation of the configuration is omitted.

Next, a configuration of the Cloud server 4 is explained. As illustrated in FIG. 1, the Cloud server 4 includes a control unit (a controller) 36 that comprehensively controls units of the Cloud server 4. A data storing unit 38 and a communication unit 40 are connected to the control unit 36.

The data storing unit 38 stores post-collection store information transmitted from the smartphones 2a to 2c after collection of used oshiboris is finished. The communication unit 40 communicates with each of the smartphones 2a to 2c and the core system 6 via the network 8. According to an instruction of the control unit 36, the communication unit 40 receives post-collection store information obtained by adding a collection date, an estimated number of used oshiboris, photographing position information, and the like to store information before collection from the smartphones 2a to 2c via the network 8. In addition, the communication unit 40 transmits the post-collection store information received from the smartphones 2a to 2c to the core system 6 via the network 8 according to an instruction of the control unit 36.

Next, a configuration of the core system 6 is explained. The core system 6 includes a control unit (a controller) 42 that comprehensively manages overall information concerning rental oshiboris and comprehensively controls units of the core system 6 as illustrated in FIG. 1. An input unit 44, a display unit 46, a data storing unit 48, and a communication unit 50 are connected to the control unit 42.

The input unit 44 is a keyboard, a mouse, or the like and outputs an input result input by a user of the core system 6 to the control unit 42. The display unit 46 is a liquid crystal panel or the like and displays delivery course information, store information, oshibori information, and the like. The data storing unit 48 stores delivery course information 52, which is information concerning a delivery course (a delivery area) including a delivery course code, store information 54, which is information concerning a store that delivers rental oshiboris, and oshibori information 56, which is information concerning a type of oshiboris and the like and a login authentication key of another user (a deliverer), an expiration date of the authentication key, a user name, a password, a belonging company name, a unit of the number of delivered oshiboris (package unit) of the belonging company, and the like.

The communication unit 50 communicates with the smartphones 2a to 2c and the Cloud server 4 via the network 8. The communication unit 50 transmits store information including a delivery course code to the smartphones 2a to 2c via the network 8 as pre-collection store information according to an instruction of the control unit 42. According to an instruction from the control unit 42, the communication unit 50 receives post-collection store information obtained by adding a collection date, an estimated number of used oshiboris, photographing position information, and the like to the store information before collection from the Cloud server 4 via the network 8. The control unit 42 updates the store information 54 by causing the data storing unit 48 to store the post-collection store information received from the Cloud server 4.

Figure 6:
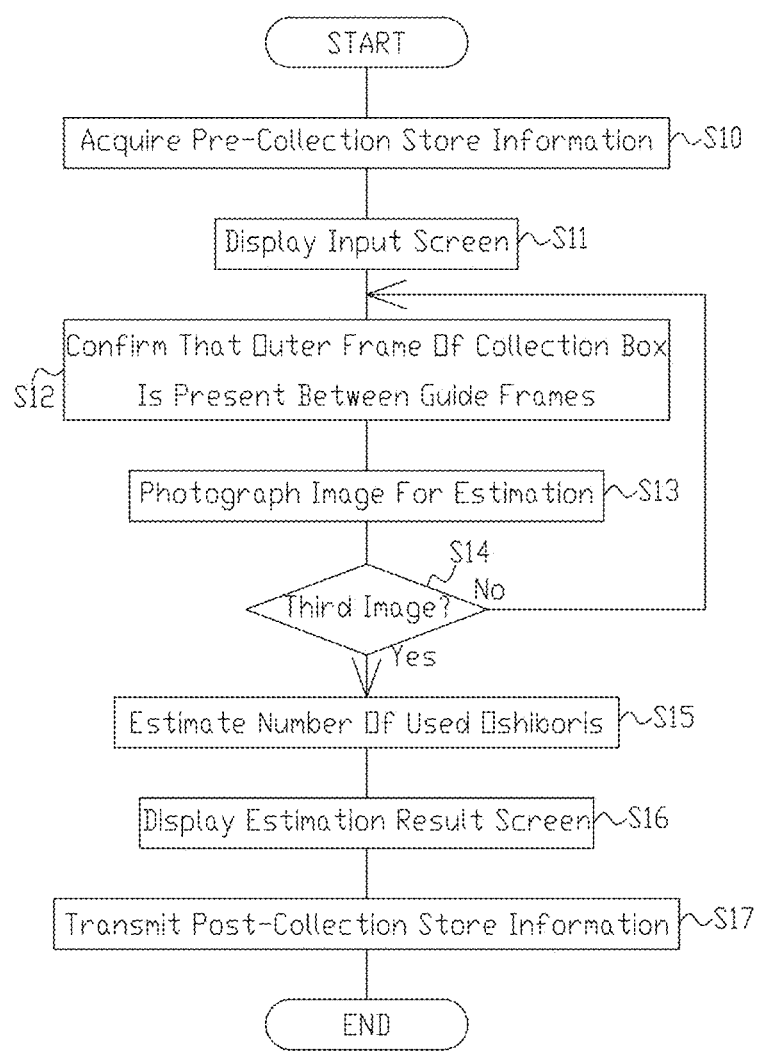
FIG. 6 is a flowchart explaining processing executed by the oshibori management system according to the first embodiment in order to estimate the number of used oshiboris stored in a collection box.

Next, a number of oshiboris estimating method for estimating the number of used oshiboris stored in the collection box using the oshibori management system 1 according to the first embodiment is explained with reference to the drawings. FIG. 6 is a flowchart for explaining processing executed by the oshibori management system 1 in order to estimate the number of used oshiboris stored in the collection box.

First, the deliverer confirms a delivery course for going around to collect oshiboris on the day and inputs a delivery course code (inputs a "course" illustrated in FIG. 3) via the input unit 12. Thereafter, the control unit 10 of the smartphone 2a carried by the deliverer acquires store information (pre-collection store information) included in the delivery course from the core system 6 (step S10). The control unit 10 acquires the delivery course code input from the deliverer via the input unit 12, transmits the acquired delivery course code to the core system 6 via the communication unit 20 and the network 8, and requests the core system 6 to provide the store information included in the delivery course. The control unit 42 of the core system 6 receives, via the network 8 and the communication unit 50, the delivery course code and the provision request for the store information included in the delivery course transmitted from the smartphone 2a. Then, the control unit 42 reads store information of a store code linked with the delivery course code from the data storing unit 48 and transmits the store information to the smartphone 2a via the communication unit 50 and the network 8. The control unit 10 of the smartphone 2a receives the store information included in the delivery course via the network 8 and the communication unit 20 and causes the data storing unit 16 to store the store information as the store information 24.

Next, when the deliverer arrives at a first store and collects used oshiboris and the smartphone 2a receives an instruction to start estimating the number of oshiboris from the deliverer by operating the input unit 12, the display control unit 34 of the control unit 10 causes the display unit 18 to display the screen 18a illustrated in FIG. 3 (step S11). At this time, the display control unit 34 causes the display unit 18 to also display guide frames 19a and 19b for guiding the outer frame of the collection box with respect to a photographing range of the live view image 58 to be a predetermined position. Then, the control unit 10 checks the store code, the type of oshiboris, and the oshibori density input via the input unit 12. Furthermore, the control unit 10 confirms whether the outer frame of the collection box is fit between the guide frame 19a and the guide frame 19b displayed in the live view image 58. At this time, all store codes may be read in advance from the store information 24 to make it possible to select the store code in a pull-down format. When the store code is input, a type of oshiboris (a type of oshiboris contracted with the store) linked with the store code may be read from the store information 24 to automatically select the type of oshiboris. FIG. 3 illustrates a case where "oshiboris A" and "tight" are selected.

The deliverer taps a "no delivery" button illustrated in FIG. 3 for a store that is included in the delivery course but does not request delivery of oshiboris on the day (neither collection nor delivery of oshiboris). When confirming that the "no delivery" button is tapped via the input unit 12, the control unit 10 causes the data storing unit 16 to store post-collection store information obtained by adding a delivered flag to the pre-collection store information relating to the store, skips processing in steps S12 to S16, and executes processing in step S17 explained below.

The deliverer taps a "no collection" button illustrated in FIG. 3 for a store that is included in the delivery course but does not request collection of the oshiboris on the day (requests only delivery of oshiboris). When confirming that the "no collection" button is tapped via the input unit 12, the control unit 10 sets the number of used oshiboris to be collected relating to the store to 0 and skips the processing in steps S12 to S16. Then, the display control unit 34 of the control unit 10 causes the display unit 18 to display the delivery registration screen 18c illustrated in FIG. 5 without causing the display unit 18 to display the collection registration screen 18b illustrated in FIG. 4. The control unit 10 executes the processing in step S17 explained below.

After confirming that the outer frame of the collection box is fit between the guide frame 19a and the guide frame 19b displayed in the live view image 58 (step S12), the photographing control unit 31 of the control unit 10 causes the photographing unit 14 to photograph an image for estimation (step S13). The photographing unit 14 photographs an image for estimation. The control unit 10 acquires the image for estimation photographed by the photographing unit 14 and causes the data storing unit 16 to store the image for estimation. After confirming that the outer frame of the collection box is fit between the guide frame 19a and the guide frame 19b displayed in the live view image 58, the photographing control unit 31 may permit a photographing instruction for an image for estimation by the deliverer and, when receiving the photographing instruction from the deliverer via the input unit 12, the photographing control unit 31 may cause the photographing unit 14 to photograph the image for estimation.

Next, the control unit 10 determines whether the image for estimation photographed in step S13 is a third image for estimation (step S14). When the image for estimation is not the third image (a first image or a second image) (step S14: No), the control unit 10 repeats the operations of steps S12 and S13. On the other hand, when the image for estimation is the third image (step S14: Yes), the estimating unit 32 of the control unit 10 estimates the number of used oshiboris (step S15).

First, the estimating unit 32 confirms whether selection of oshibori density input in an input form is "tight" or "loose". In the case of "tight", the estimating unit 32 reads the first learning model 22, which is a learning model in the case where the oshibori density is higher than a predetermined density, from the data storing unit 16. On the other hand, in the case of "loose", the estimating unit 32 reads the second learning model 23, which is a learning model in the case where the oshibori density is equal to or lower than the predetermined density, from the data storing unit 16. The estimating unit 32 confirms whether the selection of the type of the oshiboris input in the input form is "oshiboris A" or "oshiboris B" and reads the correction coefficient of the oshiboris B from the correction coefficient 26 of the data storing unit 16 in the case of "oshiboris B".

Then, the estimating unit 32 estimates the number of used oshiboris using the first learning model 22 when the oshibori density is "tight" and the type of oshiboris is "oshiboris A". When the oshibori density is "tight" and the oshibori type is "oshiboris B", the estimating unit 32 estimates the number of used oshiboris using the first learning model 22 and then corrects the number of used oshiboris by multiplying the estimation result by the correction coefficient of the oshiboris B. When the oshibori density is "loose" and the type of oshibori is "oshiboris A", the estimating unit 32 estimates the number of used oshiboris using the second learning model 23. In the case where the oshibori density is "loose" and the oshibori type is "oshiboris B", the estimating unit 32 estimates the number of used oshiboris using the second learning model 23 and then corrects the number of used oshiboris by multiplying the estimation result by the correction coefficient of the oshiboris B.

The estimating unit 32 extracts a contour of an image, a contour of the outer edge of a used oshibori group with respect to the outer frame of the collection box, and the like with the neural network using the image for estimation as an input value. The estimating unit 32 outputs an estimated number of used oshiboris result as an output value using hundreds to tens of millions of parameters including a parameter for estimating the number of used oshiboris from the contour of the outer edge of the used oshibori group with respect to the outer frame of the collection box.

The estimating unit 32 performs the estimation explained above on each of the three images photographed by the photographing unit 14 and transmits three estimation results to the detecting unit 33. The detecting unit 33 detects whether there is an abnormal value in the three estimation results and transmits information concerning the abnormal value such as the presence or absence of the abnormal value to the arithmetic operation unit 35. The arithmetic operation unit 35 calculates an average of the three estimation results when no abnormal value is detected by the detecting unit 33. When an abnormal value is detected by the detecting unit 33, The arithmetic operation unit 35 calculates an average of two estimation results excluding the abnormal value detected by the detecting unit 33.

When finishing the estimation of the number of used oshiboris, the control unit 10 causes the display unit 18 to display the collection registration screen 18b illustrated in FIG. 4 via the display control unit 34 (step S16). The estimation result illustrated in FIG. 4 is 73 oshiboris and an image 60 illustrated in FIG. 4 is an image photographed by the photographing unit 14 and used for the estimation of the number of oshiboris by the estimating unit 32. When confirming an input of an OK button from the deliverer via the input unit 12, the display control unit 34 of the control unit 10 causes the display unit 18 to display the delivery registration screen 18c illustrated in FIG. 5. The proper number of oshiboris to be delivered illustrated in FIG. 5 is 80, which is a result of selecting the number of oshiboris closest to an estimated number of oshiboris of 73 from choices of 0, 40, 80, and 120. The proper number of oshiboris to be delivered can be corrected by the deliverer via the input unit 12. For example, it is also possible to manually select 0 when the next delivery is not required such as when the store is on a holiday and select 120 (40) when the store desires delivery more (less) than usual for a reason such as a season. It is also possible to input the number of oshiboris other than 0, 40, 80, and 120 in the other fields. The control unit 10 transmits the post-collection store information to which an estimation result, the number of delivered oshiboris, and the like are added to the Cloud server 4 via the communication unit 20 (step S17).

The processing illustrated in the flowchart of FIG. 6 is performed on all stores included in the delivery course. Instead of being performed for each of the stores, in the processing of step S17, the control unit 10 may store the post-collection store information in the data storing unit 16 and collectively transmit the post-collection store information of several stores to the Cloud server 4. The core system 6 receives the post-collection store information from the Cloud server 4 according to necessity and updates the store information 54 in the data storing unit 48.

With the oshibori management system 1 according to the first embodiment, it is possible to quickly estimate the number of collected used oshiboris without counting the oshiboris one by one. By managing the number of used oshiboris for each store, it is possible to appropriately manage a contracted number of oshiboris, the number of additional oshiboris involved in seasonal variations, the number of collected oshiboris, the number of lost oshiboris, the number of oshiboris in stock in the store, and the like. In addition, with the smartphones 2a to 2c according to the first embodiment, even a deliverer inexperienced in collecting used oshiboris can easily estimate the number of used oshiboris. Even when various deliverers collect oshiboris, it is possible to evenly estimate the number of used oshiboris.

In the embodiment explained above, the case where the acquiring unit 30 acquires the image for estimation photographed by the photographing unit 14 is explained as an example. However, an image stored in the data storing unit 16 or an image received via the communication unit 20 may be acquired as the image for estimation.

In the embodiment explained above, the case where the photographing unit 14 photographs the three (a plurality of) images for estimation is explained as an example. However, the photographing unit 14 may photograph one image for estimation. In this case, it is unnecessary to include the detecting unit 33 and the arithmetic operation unit 35. An estimation result by the estimating unit 32 is output.

In the embodiment explained above, when the difference between one estimation result and the other two estimation results exceeds the threshold, the detecting unit 33 detects that the one estimation result is an abnormal value. That is, the abnormal value is detected from the comparison with the other two estimation results. However, the abnormal value may be detected from the comparison with estimation results of other days (or other months or other same days of the week) in the same store. When the estimation result on the day is 150 even though the estimated numbers of oshiboris in other days are 40 to 60 in the same store, the detecting unit 33 detects that the estimation result on the day is an abnormal value. The control unit 10 instructs the photographing control unit 31 to perform re-photographing.

In the embodiment explained above, the smartphones 2a to 2c transmit the post-collection store information to the core system 6 via the Cloud server 4. However, the post-collection store information may be once stored in the data storing units 16 of the smartphones 2a to 2c and, after the deliverer finishes going around the delivery course, collectively transmitted to the Cloud server 4 or the core system 6.

In the embodiment explained above, the deliverer inputs, via the input unit 12, whether the density of the oshiboris stored in the collection box is higher than the predetermined density. However, the density of the oshiboris may be detected based on the image for estimation. A portion of the oshiboris and a portion that is not the oshiboris (a gap between the oshiboris and the oshiboris) are extracted from an image analysis of the image for estimation and the density of the oshiboris is detected based on an extraction result.

In the embodiment explained above, the number of oshiboris is estimated using the first learning model 22 when the density of oshiboris stored in the collection box is higher than the predetermined density and is estimated using the second learning model 23 when the density is equal to or lower than the predetermined density. However, a learning model (a density discrimination learning model) for discriminating whether the density is higher than the predetermined density may be implemented. In this case, whether the density is higher than the predetermined density is discriminated using the density discrimination learning model and the first learning model 22 or the second learning model 23 is selected from a discrimination result.

In addition, when the first learning model 22 or the second learning model 23 is created using the neural network and when the number of used oshiboris is estimated using the first learning model 22 or the second learning model 23 in the embodiment explained above, the pixel data of the image for learning or the image for estimation input to the input layer may be limited to pixel data of only an image further on the inner side than the outer frame of the collection box set by the setting unit 31. That is, an image for learning and an image for estimation obtained by deleting pixel data of an image further on the outer side than the outer frame of the collection box (an image for learning and an image for estimation in which pixel data of an image discriminated as being further on the outer side than the outer frame of the collection box is set to 0) may be used. It is possible to prevent a decrease in accuracy due to reflection of an object outside the box, which is originally unrelated to number of oshiboris information. It is possible to improve efficiency related to estimation of the number of oshiboris.

Next, an oshibori management system according to a second embodiment of the present invention is explained with reference to the drawings. In the oshibori management system according to the second embodiment, the same components as the components of the oshibori management system 1 illustrated in FIGS. 1 and 2 are denoted by the same reference numerals and signs and illustration and explanation of the components are omitted.

Figure 7:
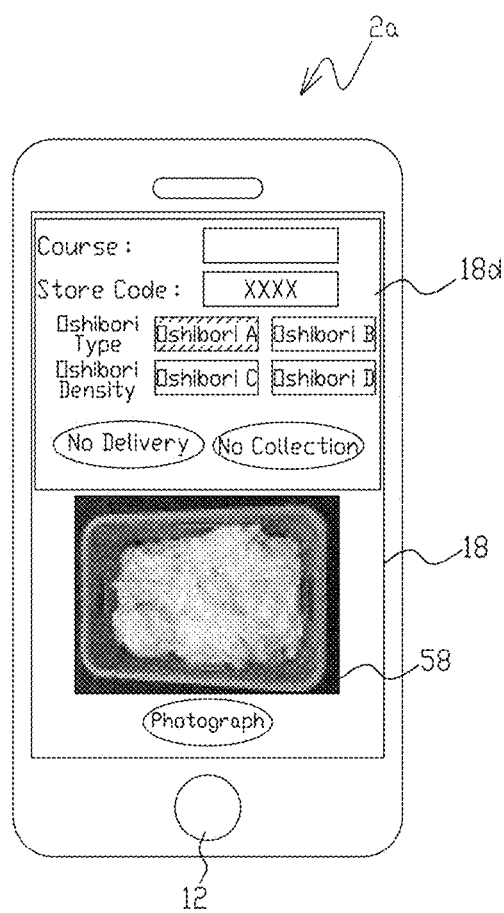
FIG. 7 is a diagram illustrating a display example on a display unit of a smartphone according to a second embodiment.
Figure 8:
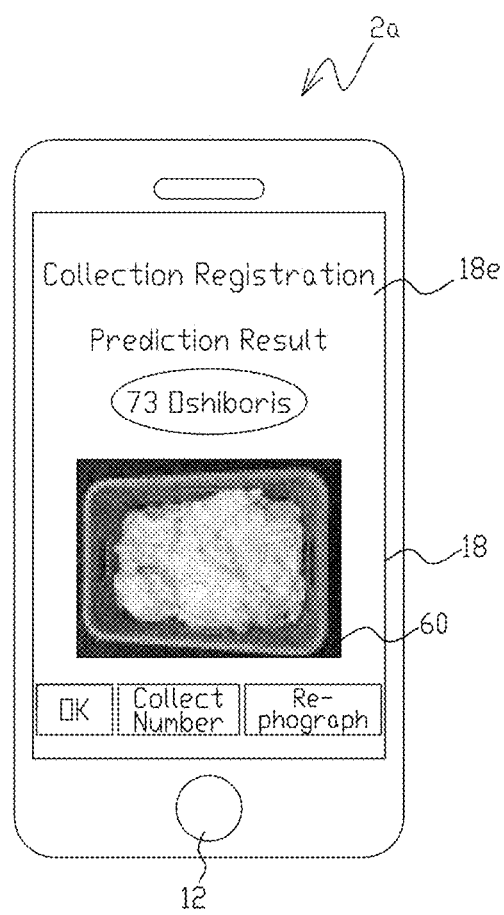
FIG. 8 is a diagram illustrating a display example on the display unit of the smartphone according to the second embodiment.

The display control unit 34 according to the second embodiment causes the display unit 18 to display a screen 18d for inputting a store and oshibori information illustrated in FIG. 7 instead of the screen 18a illustrated in FIG. 3. The display control unit 34 causes the display unit 18 to display a collection registration screen 18e showing estimation results by the estimating unit 32 illustrated in FIG. 8 instead of the collection registration screen 18b illustrated in FIG. 4. In the oshibori management system according to the second embodiment, the number of oshiboris estimated by the estimating unit 32 can be optionally corrected. When the screen 18e illustrated in FIG. 8 is displayed on the display unit 18 and the deliverer presses (touches) a number of oshiboris correction button via the input unit 12, a screen for inputting the number of oshiboris is displayed on the display unit 18. When the deliverer inputs the number of oshiboris via the input unit 12, the number of oshiboris input by the deliverer is added to the post-collection store information as a corrected number of oshiboris result (a correct answer label) and transmitted to the Cloud server 4 via the communication unit 20.

The smartphone 2a according to the second embodiment includes a standard learning model 61 (see FIG. 9), a first-type learning model, and a second-type learning model instead of the first learning model 22 and the second learning model 23 illustrated in FIG. 2.

The standard learning model 61 is a learning model for estimating the number of oshiboris A of a standard color (for example, white) and a standard size stored in a collection box of a standard color (for example, orange). In the case of the oshiboris B, the estimated number of used oshiboris is corrected using the correction coefficient of the oshiboris B such that the estimated number of oshiboris of the oshiboris B is obtained from the estimated number of oshiboris of the oshiboris A using the standard learning model 61. The size of the oshibori B is different from the size of the oshibori A. However, the difference between the sizes of the oshiboris A and B is smaller than the difference between the sizes of the oshiboris A and C or the oshiboris A and D. Therefore, the estimated number of oshiboris of the oshiboris B can be estimated using the standard learning model 61 and the correction coefficient for the oshiboris A. However, since the sizes of the oshiboris C and D are greatly different from the size of the oshiboris A, it is difficult to estimate the number of the oshiboris C and D by the standard learning model 61 and the correction coefficient.

The first-type learning model is a learning model for estimating the number of oshiboris C of the standard color stored in the collection box of the standard color. The oshiboris C have a size larger (or smaller) than the oshiboris A and B and are demanded less than the oshiboris A. The second-type learning model is a learning model for estimating the number of oshiboris D of the standard color stored in the collection box of the standard color. The oshiboris D have a size different from the size of the oshiboris C and larger (or smaller) than the oshiboris A and B and are and are demanded less than the oshiboris A and C.

The standard learning model 61, the first-type learning model, and the second-type learning model are models learned in advance using AI like the first learning model 22 and the like according to the first embodiment. As illustrated in FIG. 9, the standard learning model 61 is a learning model created through primary processing and secondary processing. In the primary processing, a primary deep learning model 66 is created by deep learning by adding corrected image data for estimation 64A, which is the image data for estimation 64 photographed so far and corrected in the number of oshiboris by the input unit 12, to the image data for learning 62.

In the secondary processing, a secondary deep learning model, that is, the standard learning model 61 is created by deep learning using labeled data 64C obtained by estimating (labeling) the number of oshiboris of the image data for learning 62, the corrected image data for estimation 64A, and the uncorrected image data for estimation 64B, which is the image data for estimation 64 photographed so far and is not corrected in the number of oshiboris with the primary deep learning model 66.

In general, as the number of image data to be learned is larger, a more highly accurate learning model can be created. However, the uncorrected image data for estimation 64B not corrected in the number of oshiboris should not be used as it is as the image data for learning. This is because it cannot be discriminated whether the information concerning the estimated number of oshiboris included in the uncorrected image data for estimation 64B is an actual number of oshiboris or an approximate number of oshiboris (a correct label). However, in order to label the uncorrected image data for estimation 64B with the primary deep learning model 66 with higher accuracy than an initial learning model (a learning model learned using only the image data for learning 62), the number of pieces of the estimated oshiboris of the labeled data 64C is closer to the correct label than that of the uncorrected image data for estimation 64B. The standard learning model (secondary deep learning model) 61 based on the image data for learning 62, the corrected image data for estimation 64A, and the labeled data 64C has more image data to be learned than the primary deep learning model 66 based on the image data for learning 62 and the corrected image data for estimation 64A. Therefore, a degree of perfection is high and the accuracy of estimating the number of oshiboris is also improved. In addition, since the image data for estimation 64 includes noise specific to the oshibori collecting place, for example, a reflection of the ground on which the collection box is placed and a reflection of a shadow compared with the image data for learning 62, it is possible to acquire, from the image data for estimation 64, a parameter that cannot be acquired from the image data for learning 62.

The first-type learning model (second-type learning model) is a learning model created by diverting (fine tuning) the same parameter as the parameter of the standard learning model 61 in a shallow layer (the input layer and the intermediate layer close to the input layer) where feature extraction (image analysis) of an image is performed and performing learning using the image data for learning of the oshiboris C (oshiboris D) in a deep layer (the intermediate layer close to the output layer and the output layer) where estimation of the number of oshiboris is performed. The demand for the oshiboris C (oshiboris D) is smaller compared with the demand for the oshiboris A and the image data for learning and the image data for estimation of the oshiboris C (oshiboris D) are smaller than those of the oshiboris A. Therefore, when a model is created using the image data for learning and the image data for estimation of the oshiboris C (oshiboris D), the feature extraction of the image cannot be accurately performed because there are few image data to be learned. A highly accurate learning model cannot be created. However, since the first-type learning model (second-type learning model) diverts (fine-tunes) the parameter of the standard learning model 61 having a large number of data, it is possible to create a highly accurate model even for the oshiboris C (oshiboris D) having less data to be learned.

FIG. 10 is a graph illustrating a correct answer label of the first-type learning model and a mean square error of an estimated number of oshiboris. (A) is a first-type learning model learned from the beginning using the image data for learning of the oshiboris B, (B) is a learning model created by finely tuning a parameter of a learned model publicly available in a shallow layer and performing learning using the image data for learning of the oshiboris C in a deep layer, and (C) is a learning model created by finely tuning a parameter of the standard learning model 61 in a shallow layer and performing learning using the image data for learning of the oshiboris C in a deep layer. As illustrated in FIG. 10, in (C), an error between the correct answer label and the estimated number of oshiboris is clearly smaller compared with (A) and (B) and a highly accurate learning model can be created by fine-tuning a parameter of a model having a larger number of data in a shallow layer.

The smartphone 2a according to the second embodiment includes a color correcting unit. The color correcting unit detects a color of the image for estimation photographed by the photographing unit 14, that is, the number of bytes of RGB colors formed by 3 bytes (R.G.B), and corrects the color of the image for estimation photographed by the photographing unit 14 before the number of used oshiboris is estimated. A color of the collection box in the image for estimation photographed by the photographing unit 14 is corrected to a color (a standard color) of the collection box in the image for learning or an approximate color of the color used when the standard learning model 61, the first-type learning model, and the second-type learning model are created. When the number of bytes of the color of the collection box in the image for estimation photographed by the photographing unit 14 is represented as X.Y.Z and the color (the standard color) of the collection box in the image for learning is represented as R1.G1.B1, color conversion is performed by replacing (1) byte arrays of R.G.B=X.Y.Z with (2) R.B.G=X.Y.Z, (3) G.R.B=X.Y.Z, (4) G.B.R=X.Y.Z, (5) B.R.G=X.Y.Z, and (6) B.G.R=X.Y.Z and the most approximate value (X.Y.Z≈R1.G1.B1) is selected out of (1) to (6). In the present embodiment, since the colors of the oshiboris A to D are white (255,255,255), the colors of the oshiboris A to D do not change even when color conversion is performed.

Next, a number of oshiboris estimating method for estimating the number of used oshiboris stored in a collection box using the oshibori management system according to the second embodiment is explained with reference to the drawings. FIG. 11 is a flowchart for explaining processing executed by the oshibori management system in order to estimate the number of used oshiboris stored in the collection box.

First, the control unit 10 acquires pre-collection store information (step S20). Since the processing in step S20 is the same as the processing in step S10 illustrated in FIG. 6, explanation of the processing is omitted. Next, the display control unit 34 of the control unit 10 causes the display unit 18 to display the screen 18d illustrated in FIG. 7 (step S21). Then, the control unit 10 checks the store code input via the input unit 12 and reads a type of oshiboris linked with the store code (a type of oshiboris contracted with the store) from the store information 24. In FIG. 7, a case is illustrated in which the oshiboris A contracted with a store having a store code "XXXX" are selected.

Next, the control unit 10 selects, based on the type of oshiboris, a learning model to be used for estimating the number of used oshiboris and reads the selected learning model (step S22). The control unit 10 reads the standard learning model 61 when the oshiboris A are selected, reads the standard learning model 61 and the correction coefficient when the oshiboris B are selected, reads the first-type learning model when the oshiboris C are selected, and reads the second-type learning model when the oshiboris D are selected.

Next, the photographing control unit 31 of the control unit 10 confirms that the outer frame of the collection box is fit in a predetermined position in the live view image 58 (the outer frame of the live view image 58 in the present embodiment) and then causes the photographing unit 14 to photograph an image for estimation (step S23). FIG. 12 is a flowchart for explaining processing executed by the photographing control unit 31 in order to cause the photographing unit 14 to photograph an image for estimation.

First, the photographing control unit 31 sets a value of N1 (N1 is an integer equal to or larger than 0) counted by a not-illustrated first counter to 0 and sets a value of N2 (N2 is an integer equal to or larger than 0) counted by a not-illustrated second counter to 0 (step S40). The first counter is a counter that counts the number of times it is determined that the position of the outer frame of the collection box is in the predetermined position. The second counter is a counter that counts the number of times it is determined that the position of the outer frame of the collection box is not in the predetermined position.

Next, the photographing control unit 31 determines whether the position of the outer frame of the collection box is in the predetermined position, specifically, whether the outer frame of the collection box is fit in the outer frame of the live view image 58 (step S41). The photographing control unit 31 performs the determination in step S41 at every predetermined interval. In the present embodiment, the photographing control unit 31 performs the determination thirty times per second. However, the photographing control unit 31 may perform the determination less than thirty times or more than thirty times per second.

When it is determined in step S41 that the outer frame of the collection box is fit in the outer frame of the live view image 58 (step S42: Yes), the photographing control unit 31 sets the value of N2 to 0 (step S43) and adds 1 to the value of N1 (step S44). Next, the photographing control unit 31 determines whether the value of N1 reaches 10 (step S45). When it is determined that the value of N1 is 10 (step S45: Yes), the photographing control unit 31 causes the photographing unit 14 to photograph an image for estimation (step S46). The photographing unit 14 automatically performs photographing without receiving a photographing instruction from the deliverer via the input unit 12. On the other hand, when it is determined that the value of N1 is not 10 (step S45: No), the photographing control unit 31 returns to the processing in step S41 and repeats the processing in step S41 and subsequent steps.

On the other hand, when it is determined in step S41 that the outer frame of the collection box is not fit in the outer frame of the live view image 58 (step S42: No), the photographing control unit 31 adds 1 to the value of N2 (step S47). Next, the photographing control unit 31 determines whether the value of N2 is 5 (step S48). When it is determined that the value of N2 is 5 (step S48: Yes), the photographing control unit 31 returns to the processing in step S30 and repeats the processing in step S30 and subsequent steps. On the other hand, when it is determined that the value of N2 is not 5 (step S48: No), the photographing control unit 31 returns to the processing in step S41 and repeats the processing in step S41 and subsequent steps.

When it is determined 10 times that the outer frame of the collection box is fit in the outer frame of the live view image 58 (N1 of the first counter=10), the photographing control unit 31 causes the photographing unit 14 to photograph an image for estimation. On the other hand, when it is determined five times in a row that the outer frame of the collection box is not fit in the outer frame of the live view image 58 (N2 of the second counter=5), the photographing control unit 31 resets the first counter (N1=0). In the present embodiment, the photographing unit 14 performs photographing when the value of N1 is 10. However, the photographing unit 14 may be set to perform photographing when the value of N1 is less than 10 or more than 10. In the present embodiment, the first counter is reset when the value of N2 is 5. However, the first counter may be set to be reset when the value of N2 is less than 5 or more than 5.

Next, the control unit 10 corrects the color of the collection box appearing in the image for estimation photographed in step S23 (step S24). The control unit 10 detects the number of bytes of RGB colors formed by 3 bytes (R.G.B) of the image for estimation in the color correcting unit and performs color conversion by replacing the byte arrays of R.G.B. Then, the control unit 10 selects, out of converted six colors, a color closest to the color (the standard color) of the collection box in the image for learning used when creating the standard learning model 61, the first-type learning model, and the second-type learning model.

Next, the estimating unit 32 of the control unit 10 estimates the number of used oshiboris (step S25). When a type of oshiboris is "oshiboris A", the estimating unit 32 estimates the number of used oshiboris using the standard learning model 61. When the type of the oshiboris is "oshiboris B", the estimating unit 32 estimates the number of used oshiboris using the first learning model 22 and then corrects the number of used oshiboris by multiplying an estimation result by the correction coefficient of the oshiboris B. When the type of the oshiboris is "oshiboris C", the estimating unit 32 estimates the number of used oshiboris using the first-type learning model. When the type of the oshiboris is "oshiboris D", the estimating unit 32 estimates the number of used oshiboris using the second-type learning model. Since specific processing is the same as the processing in step S15 illustrated in FIG. 6, explanation of the specific processing is omitted.

When finishing the estimation of the number of used oshiboris, the control unit 10 causes the display unit 18 to display the collection registration screen 18e illustrated in FIG. 8 via the display control unit 34 (step S26). Next, the control unit 10 discriminates whether the number of oshiboris correction button is pressed by the deliverer via the input unit 12 (step S27). When it is discriminated in step S27 that the number of oshiboris correction button is pressed (step S27: Yes), the control unit 10 causes the display unit 18 to display a not-illustrated number of oshiboris correction input screen via the display control unit 34 (step S28). Then, the control unit 10 acquires a corrected number of used oshiboris (the number of corrected oshiboris of an estimation result) input by the deliverer via the input unit 12 and adds the input number of oshiboris to the post-collection store information as a corrected number of oshiboris result (a correct answer label). Then, when confirming an input of the OK button from the deliverer via the input unit 12, the display control unit 34 of the control unit 10 causes the display unit 18 to display the delivery registration screen 18c illustrated in FIG. 5 and proceeds to processing in step S29.

On the other hand, when the number of oshiboris correction button is not pressed and the OK button is pressed in step S27 (step S27: No), the display control unit 34 of the control unit 10 causes the display unit 18 to display the delivery registration screen 18c illustrated in FIG. 5 and proceeds to the processing in step S29. Since the specific processing is the same as the processing in step S17 illustrated in FIG. 6, explanation of the specific processing is omitted.

With the oshibori management system according to the second embodiment, it is possible to quickly estimate the number of collected used oshiboris without counting the used oshiboris one by one. Then, by managing the number of used oshiboris for each store, it is possible to appropriately manage a contracted number of oshiboris, the number of additional oshiboris involved in seasonal variations, the number of collected oshiboris, the number of lost oshiboris, the number of oshiboris in stock in the store, and the like.

With the smartphones 2a to 2c according to the second embodiment, even a deliverer inexperienced in collecting used oshiboris can easily estimate the number of used oshiboris. Even when various deliverers collect oshiboris, it is possible to evenly estimate the number of used oshiboris.

In addition, with the smartphones 2a to 2c according to the second embodiment, since the standard learning model 61, which is the secondary deep learning model, is used, it is possible to accurately estimate the number of used oshiboris. In addition, since the photographing is automatically performed after it is determined a predetermined number of times that the outer frame of the collection box is fit in the outer frame of the live view image 58, it is possible to avoid photographing of an irrelevant image, an image in which the outer frame of the collection box is not fit, or the like and, eventually, it is possible to suppress a decrease in accuracy of the estimated number of used oshiboris. In addition, in the first-type learning model and the second-type learning model of the oshiboris C and D having less image data for learning and image data for estimation, a parameter of the standard learning model 61 having a large number of data are fine-tuned. Therefore, a highly accurate learning model can be created.

With the smartphones 2a to 2c according to the second embodiment, since the smartphones 2a to 2c include the color correcting unit, when the color of the collection box of the image for learning used for the learning model creation and the color of the collection box of the image for estimation photographed by the photographing unit 14 are different, the color of the collection box of the image for estimation can be easily approximated to the color of the collection box of the image for learning. Therefore, it is possible to suppress a decrease in accuracy of the estimated number of used oshiboris due to a difference in the color of the collection box.

In the smartphones 2a to 2c according to the second embodiment, the smartphones 2a to 2c include the color correcting unit and performs the processing for approximating the color of the collection box of the image for estimation to the color of the collection box of the image for learning. However, the smartphones 2a to 2c may not include the color correcting unit and may be implemented with a learning model created for each of six types obtained by replacing the byte arrays of RGB. In this case, the color of the collection box of the image for estimation is detected and an optimal learning model is selected based on a detection result.

REFERENCE SIGNS LIST

1: Oshibori management system, 2a to 2c: Smartphone, 4: Cloud server, 6: Core system, 8: Network, 10: Control unit (Controller), 12: Input unit, 14: Photographing unit, 16: Data storing unit, 18: Display unit, 20: Communication unit, 22: First learning model, 23: Second learning model, 24: Store information, 26: Correction coefficient, 30 Acquiring, 31: Photographing control unit Photographing controller), 32: Estimating unit, 33: Detecting unit, 34: Display control unit (Display controller), 35: Arithmetic operation unit, 36: Control unit (Controller), 38: Data storing unit, 40: Communication unit, 42: Control unit (Controller), 44: Input unit, 46: Display unit, 48: Data storing unit, 50: Communication unit, 52: Delivery course information, 54: Store information, 56: Oshibori information, 61: Standard learning model, 62: Image data for learning, 64: Image data for estimation, 64A: Corrected image data, 64B: Uncorrected image data for estimation, 66: Primary deep learning model

The invention claimed is:

1. A portable terminal comprising: an information receiving unit that receives pre-collection store information from a core system, the pre-collection store information including a store to which oshiboris are delivered, a type of the oshiboris used by the store, a number of the oshiboris delivered to the store, a number of the oshiboris collected from the store, and a number of the oshiboris in stock at the store;
   a photographing unit that photographs used oshiboris stored in a collection box;
   a learning model storing unit that stores a learning model learned by a neural network with an image for learning as an input value and a number of the used oshiboris as an output value, the image for learning photographed the used oshiboris stored in the collection box;
   an image acquiring unit that acquires an image for estimation photographed by the photographing unit; an estimating unit that estimates a number of used oshiboris from the image for estimation acquired by the image acquiring unit, with the learning model stored in the learning model storing unit, by the neural network;
   a display unit that displays an estimation result estimated by the estimating unit; and an information transmitting unit that transmits post-collection store information added the estimation result to the pre-collection store information received by the information receiving unit to the core system.

2. The portable terminal according to claim 1, further comprising:
   a corrected number acquiring unit that acquires a corrected number correcting the number of used oshiboris in the estimation result, wherein
   the information transmitting unit transmits the post-collection store information added with the corrected number to the core system,
   the learning model is a secondary deep learning model being deep-learned by the neural network with the image for learning, a corrected image for estimation and an uncorrected image for estimation being estimated with a primary deep learning model as the input value, the corrected image for estimation being the image for estimation photographed in the past and with corrected the estimation result, the uncorrected image for estimation being the image for estimation photographed in the past and without corrected the estimation result, the primary deep learning model being deep-learned by the neural network with the image for learning and the corrected image for estimation as the input value, the number of the used oshiboris in the uncorrected image for estimation estimated from the uncorrected image for estimation with the primary deep learning model.

3. The portable terminal according to claim 1, wherein the learning model storing unit stores the learning model incorporating a parameter for estimating the number of used oshiboris from an extracted contour of an outer edge of a used oshibori group with respect to an extracted outer frame of the collection box, the extracted outer frame of the collection box and the extracted contour of the outer edge of the used oshibori group extracted from the image for learning, the used oshibori group being stored in the collection box.

4. The portable terminal according to claim 1, further comprising:
   a display control unit that, when the photographing unit photographs the image for estimation, causes the display unit to display a live view image and causes the display unit to display a guide frame for guiding a position of an outer frame of the collection box with respect to a photographing range to be a predetermined position; and
   a photographing control unit that causes the photographing unit to photograph the image for estimation when the position of the outer frame of the collection box becomes the predetermined position.

5. The portable terminal according to claim 1, further comprising:
   a determining unit that, when the photographing unit photographs the image for estimation, causes the display unit to display a live view image and determines at each predetermined interval whether a position of an outer frame of the collection box with respect to the photographing range is in a predetermined position;
   a counting unit that counts a number of times the determining unit determines that the position of the outer frame of the collection box is in the predetermined position; and
   a photographing control unit that causes the photographing unit to photograph the image for estimation when the number of times counted by the counting unit reaches a predetermined number, wherein
   the photographing control unit resets the count by the counting unit when the determining unit determines, consecutively a preset number of times, that the position of the outer frame of the collection box is not in the predetermined position.

6. The portable terminal according to claim 1, wherein the learning model storing unit stores the learning model learned with the image for learning with image data of further on an outer side than an outer frame of the collection box deleted, and
   the estimating unit estimates the number of used oshiboris with the image for estimation with image data of further on the outer side than the outer frame of the collection box deleted.

7. The portable terminal according to claim 1, further comprising:
   a density detecting unit that detects density of the used oshiboris in the collection box based on the image for estimation, wherein
   the estimating unit estimates the number of used oshiboris using the density detected by the density detecting unit.

8. The portable terminal according to claim 1, further comprising:
   a density input unit that inputs whether the density of the used oshiboris in the collection box is higher than predetermined density, wherein
   the estimating unit estimates the number of used oshiboris using an input result input by the density input unit.

9. The portable terminal according to claim 1, further comprising:
   an arithmetic operation unit that performs an arithmetic operation concerning the number of used oshiboris, wherein
   the photographing unit photographs a plurality of the images for estimation,
   the estimating unit respectively estimates numbers of used oshiboris in the plurality of the images for estimation,
   the arithmetic operation unit calculates an average of a plurality of estimation results estimated by the estimating unit, and
   the display unit displays the average calculated by the arithmetic operation unit as the estimation result.

10. The portable terminal according to claim 9, further comprising:
   an abnormal value detecting unit that detects an abnormal value of the plurality of estimation results, wherein the arithmetic operation unit calculates the average of the plurality of estimation results excluding the abnormal value detected by the abnormal value detecting unit.

11. The portable terminal according to claim 1, further comprising:
a type acquiring unit that acquires a type of the oshiboris; and
a correction coefficient storing unit that stores a correction coefficient based on weight of the oshiboris set for each type of the oshiboris, wherein
the estimating unit acquires the correction coefficient of the type of the oshiboris acquired by the type acquiring unit from the correction coefficient storing unit and corrects the number of used oshiboris using the acquired correction coefficient.

12. The portable terminal according to claim 1, further comprising:
a color correcting unit that corrects a color of the collection box appearing in the image for estimation to a color of the collection box appearing in the image for learning or an approximate color of the color.

13. A portable terminal comprising: an information receiving unit that receives pre-collection store information from a core system, the pre-collection store information including a store to which oshiboris are delivered, a type of the oshiboris used by the store, a number of the oshiboris delivered to the store, a number of the oshiboris collected from the store, and a number of the oshiboris in stock at the store;
a photographing unit that photographs first used oshiboris stored in a collection box;
a learning model storing unit that stores a learning model learned by a neural network with an image for learning as an input value and a number of the first used oshiboris as an output value, the image for learning photographed second used oshiboris stored in the collection box,
the second used oshiboris being different from the first used oshiboris; an image acquiring unit that acquires an image for estimation photographed by the photographing unit; an estimating unit that estimates a number of first used oshiboris from the image for estimation acquired by the image acquiring unit, with the learning model stored in the learning model storing unit, by the neural network; a display unit that displays an estimation result estimated by the estimating unit; and an information transmitting unit that transmits post-collection store information added the estimation result to the pre-collection store information received by the information receiving unit to the core system.

14. An oshibori management system comprising the portable terminal according to claim 1 and a core system, wherein
the core system includes:
an information storing unit that stores pre-collection store information;
a transmitting unit that transmits the pre-collection store information stored in the information storing unit to the portable terminal;
a receiving unit that receives post-collection store information transmitted from the portable terminal; and
an update unit that updates the pre-collection store information by causing the information storing unit to store the post-collection store information received from the receiving unit.

* * * * *